United States Patent [19]

Kafka et al.

[11] Patent Number: 4,943,402

[45] Date of Patent: Jul. 24, 1990

[54] PROCESS FOR REMOVING CHLOROPRENE DIMERS FROM POLYCHLOROPRENE

[75] Inventors: Fred Y. Kafka, Louisville, Ky.; Archie R. Bice, Landenberg, Pa.; Donald K. Burchett, Louisville, Ky.

[73] Assignee: E. I. du Pont de Nemours and Company, Wilmington, Del.

[21] Appl. No.: 429,577

[22] Filed: Oct. 31, 1989

[51] Int. Cl.⁵ .................. B29C 47/60; B29C 47/76; B29C 71/02
[52] U.S. Cl. ........................... 264/141; 34/14; 34/36; 34/164; 264/211.23; 264/232; 264/234; 264/344; 425/204; 425/209; 526/71; 528/483; 528/502
[58] Field of Search ............. 264/85, 101, 102, 141, 264/211.2, 211.23, 232, 234, 344, 345, 349; 425/203, 204, 205, 207, 208, 209; 526/68, 71; 528/483, 484, 501, 502; 34/14, 33, 36, 164, 236

[56] References Cited

U.S. PATENT DOCUMENTS

| Re. 30,378 | 8/1980 | Bice et al. | 528/486 |
| 3,988,306 | 10/1976 | Turner | 528/502 X |
| 4,136,251 | 1/1979 | Bice et al. | 528/486 |
| 4,183,887 | 1/1980 | Karg | 528/502 X |
| 4,213,888 | 7/1980 | Karg et al. | 528/483 X |
| 4,508,592 | 4/1985 | Kowalski | 159/2.1 |

Primary Examiner—Jeffrey Thurlow
Assistant Examiner—Leo B. Tentoni

[57] ABSTRACT

Removing chloroprene dimers from polychloroprene by feeding to a screw extruder a polychloroprene latex and coagulating the latex in the extruder, feeding the coagulated latex to a dewatering zone and discharging the coagulated polychloroprene through a flow restriction which heats and pressurizes the polychloroprene to an area of reduced pressure to form a porous crumb. Also, the flow restriction applies back pressure sufficient that the water in the polychloroprene is forced out of a vent port. The polychloroprene crumb discharged from the extruder is heated to strip chloroprene dimer therefrom.

6 Claims, 2 Drawing Sheets

PROCESS FOR REMOVING CHLOROPRENE DIMERS FROM POLYCHLOROPRENE

BACKGROUND OF THE INVENTION

This invention relates to a process for removing chloroprene dimers from polychloroprene.

Polychloroprene, manufactured by emulsion polymerization, contains dimers of the monomer 2-chloro-1,3-butadiene including trans-1,2-dichloro 1,2-divinylcyclobutane, 1-chloro-5-(1-chlorovinyl)cyclohexane, 1-chloro-4-(1-chlorovinyl)cyclohexane, and 1,6-dichloro-1,5-cyclooctadiene, among other chloroprene dimers. The chloroprene dimers are formed during polymerization and they are ultimately dissolved throughout the resulting polychloroprene. Merely drying polychloroprene does not remove chloroprene dimers because these contaminants are dissolved in the polychloroprene and not in the water on the surface of the polychloroprene. Chloroprene dimers have a pungent, unpleasant odor which requires their removal for many subsequent uses. Chloroprene dimers have been removed from polychloroprene by isolating the polymer, made by an emulsion polymerization process, on freeze rolls to form a thin frozen film of polymer 500 microns thick or less. The film is washed with hot water, partially dried between two opposing squeeze rolls and the film is carried, festoon fashion, through an oven. This procedure is costly in terms of energy and manpower and is inflexible because it can only be used with polymers which can be formed into a pliable yet tough film. It has now been discovered that chloroprene dimers can be readily removed from the polychloroprene by a novel and economical process employing an extruder isolation procedure.

SUMMARY OF THE INVENTION

The present invention is directed to a process for removing chloroprene dimers from polychloroprene which comprises:

(a) feeding to a screw extruder a polychloroprene latex, (b) coagulating the polychloroprene latex in the screw extruder, (c) feeding the coagulated polychloroprene in the extruder into a dewatering zone, (d) discharging the coagulated polychloroprene through a flow restriction, which heats and pressurizes the polychloroprene, into an area of reduced pressure thereby forming a porous polychloroprene crumb while, at the same time, said flow restriction applies back pressure sufficient that water present in the coagulated polychloroprene is separated therefrom and forced out of a vent provided in the extruder upstream from the flow restriction, (e) heating the porous polychloroprene crumb discharged from the extruder by passing a stream of gas substantially inert to the polychloroprene through the polychloroprene crumb at a temperature of at least about 100° C. for a time sufficient to strip from the polychloroprene by diffusion at least about 50% by weight chloroprene dimers.

DETAILED DESCRIPTION OF THE INVENTION

Figure 1:
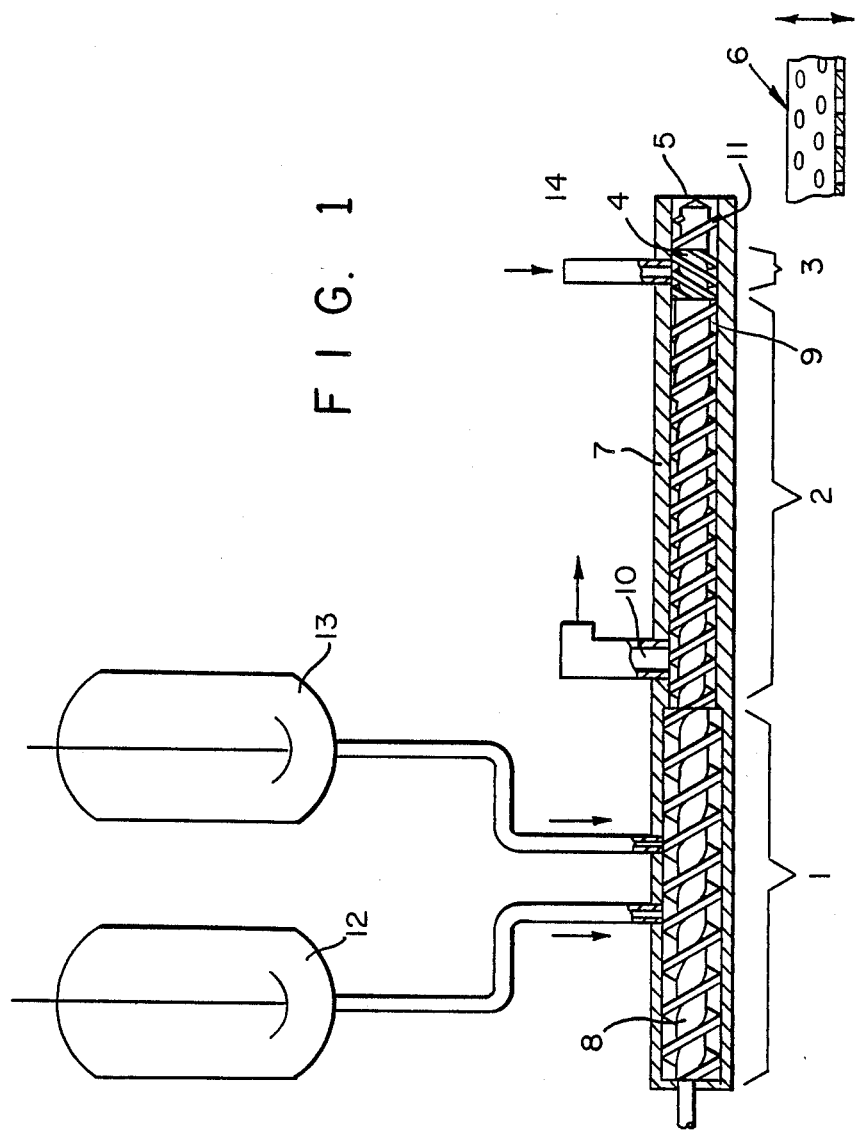
FIG. 1 is a partially diagrammatic, sectional side view of the dewatering extruder and dryer used in the process of this invention.

The polychloroprene used in the process of this invention is in the form of a latex. Generally, the latex has a solids content of about 25-75%, usually about 35-60%. Conventional emulsifying agents are mixed with water, chloroprene monomer and other optional ingredients to form an emulsion and, subsequent to polymerization, a latex. The latex particles consist of aggregates of the elastomer protected by the emulsifying agent, e.g., rosin soaps, which are absorbed on the surface of the particles.

The polychloroprene is a sulfur-modified, an alkyl mercaptan-modified, or a dialkyl- or dialkoxy xanthogen disulfide-modified polychloroprene homopolymer or copolymer of chloroprene and 2,3-dichlorobutadiene-1,3, or a monoethylenically unsaturated monomer containing from 3 to 10 carbon atoms or mixtures thereof. The ethylenically unsaturated monomer may be further described as a vinyl monomer having a boiling point of from 0° to 200° C. The preferred vinyl monomers are acrylonitrile, methacrylonitrile, lower alkyl acrylates, methacrylates, acrylamides, methacrylamides, maleates and fumarates, acrylic acid, methacrylic acid, fumaric acid, and maleic acid. The vinyl monomers are generally less reactive than 2-chloro-1,3-butadiene in contrast to 2,3-dichloro-1,3-butadiene which is more reactive.

The alkyl mercaptan modifiers used in the preparation of the polychloroprene generally have chain lengths of about from 4–20 carbon atoms. The alkyl radicals may be straight-chained or branched, and they may be primary, secondary, or tertiary. The dialkyl xanthogen disulfide modifiers can be represented by the structure

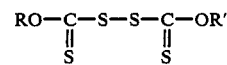

wherein R and R' are alkyl radicals having 1–8 carbon atoms. Examples of suitable alkyl radicals are methyl ethyl, propyl, isopropyl, and the various isomeric butyl, amyl, hexyl, heptyl, and octyl radicals. The preferred dialkyl xanthogen disulfides are those in which each alkyl radical has 1–4 carbon atoms, especially diisopropyl xanthogen disulfide. The dialkoxy xanthogen disulfide modifiers are compositions of the formula

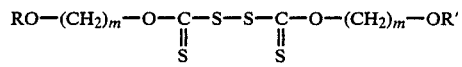

wherein R and R' are alkyl radicals having 1–8 carbon atoms and m is 2 to 6. Examples of suitable alkyl radicals are methyl, ethyl, butyl, and hexyl with ethyl being preferred. The modifier may also be elemental sulfur. Generally, the modifier content of the polymer is from 0.05 to 0.15 weight percent in order to maintain the gel content of the product within the desired range. The chloroprene polymer is prepared by emulsion polymerization at 10° C. to 50° C. Generally, the polymerization is stopped at a chloroprene monomer conversion of 40% or higher.

The polychloroprene latex is coagulated in the screw extruder. Suitable coagulants used in the present process include aqueous solutions of salts such as calcium chloride, aluminum sulfate, sodium chloride, sodium sulfate, or sodium acetate. Cationic soaps such as polyoxypropylene methyl diethyl ammonium chloride (EMCOL CC-9) and aqueous polyamine solutions can also be used, either alone or in conjunction with salts, to neutralize the anionic surfactants used to stabilize the latex. Alternatively, mechanical coagulation of the elastomer can be conducted by introducing a second high pressure section between the elastomer latex injection point and the waste liquid removal point, the latex being coagulated by high shear in this region. Cylindrical barrel-filling screw bushings can be used for this purpose to subject all passing polychloroprene latex to high sustained shear.

For polychloroprene, typically prepared from a monomer emulsion stabilized with resin or rosin soap at a pH of 10 or higher, mineral acids and carboxylic acids can be used to reduce the pH to neutralize the resin or rosin soaps and initiate or accelerate coagulation. The preferred acid is acetic acid which may be added as a separate stream or in admixture with the coagulant. The coagulant and acid can be added upstream or downstream from the point the latex blend is added to the extruder. A preferred coagulant is polyoxypropylene methyl diethyl/ammonium chloride injected at about at least 0.2 parts per hundred parts elastomer in an aqueous solution with sufficient acetic acid to reduce waste water pH to below about 7.0.

Water-dispersable thickeners can be used in this process. They may be added with the latex, the coagulant, or as a separate stream. The thickener increases the efficiency of coagulation and minimizes the amount of dispersed polymer in the effluent water. Suitable thickeners include, for example, Alcogum 6625 sodium polyacrylate and Alcogum SL-76 acrylic emulsion terpolymer, both available from Alco Chemical Company, hydroxyethylcellulose, various starches, gums and peptides known to those skilled in the art.

The polychloroprene latex is fed to a dewatering zone where the polychloroprene rubber contacts a flow restriction in the form of a pressure seal. The particular pressure applied to the latex varies widely and depends on the flow rate, restriction design, screw speed and compound viscosity. Such pressures generated are generally from about 200-2000 psi (1.35-13.8 MPa), usually 800-1500 psi, (5.5-10.3 MPa) measured immediately upstream of the pressure seal. A substantial amount of water is separated from the coagulated polychloroprene as it passes through the flow restriction that applies back pressure so that waste-water is removed in the dewatering zone through a vent upstream from the flow restriction.

The coagulated polychloroprene that passes through the flow restriction contains from about 2-35 weight percent water, usually about 5-20 weight percent water. The polychloroprene is subsequently discharged from the terminal end of the extruder to an area of reduced pressure, e.g., atmospheric pressure. The flow restriction serves to pressurize and heat the polychloroprene and residual water, which partially flashes at the extruder discharge to produce a fine, porous crumb of sufficient surface area to permit subsequent stripping of chloroprene dimers that are dissolved in the polychloroprene. The temperature of the polychloroprene being discharged from the extruder usually is from about 50°-100° C. Polychloroprene in the form of a porous crumb renders the polymer especially suitable for removal by diffusion of chloroprene dimers dissolved in the polymer.

The polychloroprene crumb discharged from the extruder is heated to strip by diffusion chloroprene dimers dissolved in the polymer by passing a stream of gas substantially inert to the polychloroprene through the crumb. Preferably, the polychloroprene crumb is heated on a perforated sparsely loaded dryer deck that vibrates to convey and prevent clumping or massing of the polychloroprene crumb. The polychloroprene crumb is heated to a temperature of at least 100° C. for a time sufficient to strip chloroprene dimers. The temperature of the crumb should not exceed 175° because the polychloroprene begins to degrade at about that temperature. Generally, the polychloroprene crumb is heated to at least 100° C. and not greater than 160° C. to strip chloroprene dimers. Excellent results are obtained when the polychloroprene crumb is heated for about two to four minutes with gas heated to about 140-160° C. The stream of gas substantially inert to the polychloroprene not only heats and strips the dimer, but agitates the polychloroprene crumb to prevent undue particle aggregation. Not only does the heat treatment remove chloroprene dimer dissolved in the polymer; it also removes residual water on the surface of the polymer. Representative gases inert to the system that can be used include air, nitrogen, carbon dioxide, flue gases, etc. It is preferred to use air in the process.

The polychloroprene latices made by emulsion polymerization usually contain about 1000-3000 parts chloroprene dimer per million parts polychloroprene. The process described herein can remove up to 95% chloroprene dimer. Generally, it is desirable to remove at least 50 dimer. The longer the polychloroprene crumb is subjected to heating the more dimer is removed and, of course, the higher the temperature of the gas substantially inert to the polychloroprene the shorter the treatment time. Also, for best results the crumb is agitated to prevent clumping or massing by, for example, the force of the gas passing through the crumb, e.g. air; and/or drying the crumb on a deck that is vibrating.

The polychloroprene crumb from which chloroprene dimer has been stripped is cooled and packaged. Alternatively, the crumb can be subsequently extruded through a die and formed into pellets or chips and packaged.

The process can also be used to strip dimer from a compound formed by mixing the latex with an inert filler such as cotton or Kevlar ® aramid pulp then coagulating the slurry in the above-described dewatering extruder followed by discharging and processing the crumb as described herein.

Figure 2:
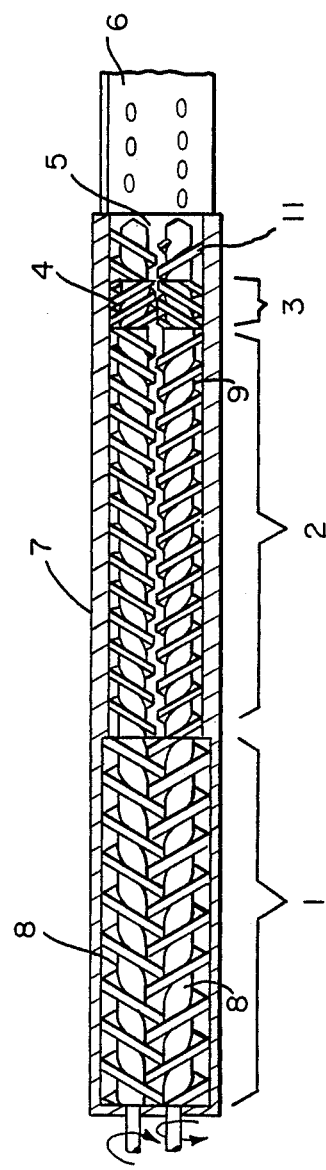
FIG. 2 is a simplified, sectional top view of the dewatering extruder screws, showing the arrangement of their flights.

Reference is made to FIG. 1 of the drawing. Feed tank 12 contains chloroprene polymer latex; 13 is a feed tank containing a coagulating agent such as an aqueous solution of acetic acid and polyoxypropylene methyl diethyl ammonium chloride; 7 is a twin-screw extruder housing containing screws 8, as shown in FIG. 2. The extruder is divided into the following three zones; 1, the polymer coagulation zone; 2, the dewatering zone; and 3, the pressure seal zone. As can be seen in FIG. 1, toward the downstream end of zone 2, the screw channels 9 can be made more shallow to provide a pumping action toward the pressure seal 4 that functions as a flow restriction. The pressure rises high enough to force the water to move counter to the screw movement.

Water is removed through vent 10. To prevent loss of polymer with the water, a mechanical dewatering device can be installed at that point. This can be, for example, a twin-screw mechanism, which returns polymer to the extruder. An automatic valve may be provided in the waste liquid exit line to maintain the desired pressure at the upstream end of zone 2. The pressure seal 4 may be one of several devices known to those skilled in extruder technology for providing a high back pressure. Shown in the figures are reverse pitch screw flight sections which are often used for this purpose. The extruder may also be equipped with a barrel valve 14 to relieve pressure developed by the pressure seal and control extrudate moisture and/or temperature. Downstream from the pressure seal the extruder can be fitted with an additional length of conveying screws 11 to assist in polymer removal.

In zone 1 the screw flights intermesh, while in zone 2 they do not intermesh but are tangential. Counter-rotating or co-rotating intermeshing screws are preferred because of their good venting characteristics and resistance to fouling. Non-intermeshing screws or a single screw extruder are also suitable but could require the use of a high pressure metering pump to force the polychloroprene latex into the extruder. The polychloroprene latex is directly expelled or discharged from the extruder assembly shown in FIG. 1 through an open die 5. The drawings are simplified in that they do not show various details obvious to those skilled in the art. For example, the extruder housing is shown without any heat transfer means. Obviously, heating or cooling by means of various fluids circulating through a jacket is possible, as well as use of electric heaters or of heating or cooling coils. The resulting porous polychloroprene crumb is discharged from the extruder through the flow restriction to vibrating conveyer dryer 6. It is often desirable to truncate one of the twin screws and use cylindrical bore barrel sections for the final zone. The conveying screws 11 are frequently such a single section, superior to a twin screw design in pressure building capability. The dryer has a perforated deck through which a stream of heated gas substantially inert to the polychloroprene passes through the polychloroprene crumb. The resultant polychloroprene crumb from which chloroprene dimer has been removed is subsequently collected and packaged.

In the operation of one embodiment of the process of this invention, chloroprene polymer latex is fed to the screw extruder between the intermeshing screws by means of a progressive cavity pump or a hose pump metering device. Coagulant, e.g., an aqueous solution of acetic acid and polyoxypropylene methyl diethyl ammonium chloride, from feed tank 13 can be injected slightly upstream or downstream of the latex injection point by means of a positive displacement metering pump. The resulting mixture of coagulum and water is conveyed forward toward the pressure seal, which may be, for example, a section of reverse pitch segments of screws as shown, or a section in which clearances between the screws and the housing are reduced to provide a restriction and, therefore, high pressure at the seal. The particular peak pressure depends on the flow rate, restriction design, screw speed and compound viscosity. Water separated from the elastomer during the coagulation process is forced back from the pressure seal section and removed through vent 10 in zone 2. Coagulum passing through the pressure seal generally contains from about 2-35 weight percent water. After the coagulum passes through the pressure seal which serves to pressurize and heat the polychloroprene and residual water, it is discharged from the extruder where the water can partially flash at the extruder discharge. This results in the formation of a porous crumb of polychloroprene as it is discharged from the extruder into an area of reduced pressure, e.g., atmospheric pressure. The porous crumb of polychloroprene is then continuously fed to a dryer having a perforated drying deck through which a stream of gas substantially inert to the polychloroprene, e.g., air, heated to at least 100° C., preferably about 140-160° C., is passed through the crumb to strip by diffusion chloroprene dimer dissolved in the polychloroprene crumb. The deck vibrates to convey the crumb and, serendipitously, to prevent massing and clumping. Alternatively, a dryer comprising perforated segments joined to form a belt can be used to convey the crumb while hot gas is pulled through the belt in one or more segmental zones to strip chloroprene dimers and remove residual water.

The present invention is illustrated below by the following preferred embodiments wherein all parts, proportions, and percentages are by weight unless otherwise indicated.

EXAMPLES

Example 1

An aqueous, alkaline emulsion of 2-chloro-1,3-butadiene, and 2,3-dichlorobutadiene-1,3 monomers mixed to give about 11% of the latter in the final product, 3.6 parts of tall oil resin acid per 100 parts total monomer and 0.2 part dodecyl mercaptan was polymerized in a nitrogen-blanketed, agitated, glass-lined kettle at 42° C. by incremental addition of an aqueous solution of 5.00% potassium persulfate and 0.02% 2-anthraquinone sulfonic acid sodium salt. After about 65% monomer conversion, the polymerization was stopped by addition of an aqueous suspension of 0.01 part of thiodiphenylamine and 0.01 part para-tertiary-butyl catechol. Unpolymerized chloroprene was removed by steam distillation at reduced pressure. The resulting latex, having a nominal specific gravity of 1.08 and a solids content of 40%, was fed to a screw extruder. This was a nominal 20 mm diameter counter-rotating twin screw extruder having an overall barrel length-to-diameter ratio of approximately 26. The 274 mm long intermeshing screw section consisted of screws 24 mm in outside diameter. The intermeshing screw section was followed by a 193 mm length of osculating conveying screws 20 mm in outside diameter. A 15 mm length of 20 mm diameter opposed cylindrical restricting elements under a barrel valve formed the next section of the extruder. The final section consisted of a 31 mm length of 20 mm diameter osculating conveying screws.

The polychloroprene latex was introduced into the extruder screw nip at a point 104 mm down the length of the intermeshing screw section. A coagulant solution comprising a 19% acetic acid solution containing 8% calcium chloride was introduced at a rate of 41 cc/min through a port 127 mm down the length of the intermeshing screw section. The polychloroprene latex coagulated and the resultant mixture of coagulated polychloroprene (coagulum) and water was conveyed forward to a point approximately 328 mm down the length of the screws where the bulk of the water was removed upstream from the pressure seal through a vent port stuffer due to back pressure generated by the pressure seal on the coagulated polychloroprene. The wet polymer was expressed past the pressure seal of opposed cylindrical restrictions with the barrel valve set two turns open. The coagulum containing no more than about 5 weight percent water was discharged through the pressure seal to generate a course steaming crumb containing about 3% water. The throughput was 21 dry kg/h and the drive power at 497 rpm was 2 kw. A 0.4 kg sample of the wet crumb was placed on a 0.1 square meter perforated steel bed through which 2 standard cubic meters per hour of 140° C. air was blown. The deck was shaken in a nearly vertical direction with a 6 mm stroke at 900 cycles per second to prevent the polychloroprene crumb from sticking together or forming clumps simulating the action of a commercial vibrating dryer. The following data were obtained.

| Time on Bed (Minutes) | Chloroprene Dimer Reduction (%) |
|---|---|
| 0 | 0 |
| 2 | 4 |
| 4 | 60 |
| 6 | 81 |

Chloroprene dimer levels were determined by glpc using a Hewlett Packard Model 7620 gas chromatograph equipped with a flame ionization detector. The column packing used was 4.6 SF 96 on Type W Chromosorb 60-80M.

EXAMPLE 2

A latex of polychloroprene prepared from 2-chloro-1,3-butadiene and 2,3-dichlorobutadiene-1,3 as described in Example 1, having a nominal specific gravity of 1.08 and a solids content of 40%, was fed to a screw extruder. The extruder was a nominal 51 mm o diameter counter-rotating twin screw extruder that had an overall barrel length-to-diameter ratio of 30. The 610 mm long intermeshing double-flighted screw section consisted of screws 60 mm in outside diameter. The intermeshing screw section was followed by a 695 mm length of osculating conveying screws 51 mm in outside diameter. The next section of the extruder was a 44 mm length with a 51 mm outside diameter reverse flighted opposed restricting elements under a barrel valve. The final section of the extruder consisted of a 162 mm length of 51 mm diameter osculating conveying screws.

The polychloroprene latex was introduced into the extruder screw nip at a point 114 mm down the length of the intermeshing screw section. A coagulant comprising 3% acetic acid solution containing 0.67% "Emcol" (polyoxypropylene methyl diethyl ammonium chloride) was introduced 229 mm down the length of the intermeshing screw section. The resultant coagulated polychloroprene was fed through the pressure seal. The bulk of the water was removed from the polychloroprene through a vent port stuffer upstream from the pressure seal and centered 762 mm down the length of the screws. The removal of water through the vent is caused by back pressure applied to the coagulum by the pressure seal. The wet polychloroprene was expressed past the opposed cylindrical restrictions with the barrel valve fully closed. The coagulum entering the pressure seal contained no more than about 13 weight percent water and the pressure generated and measured immediately upstream of the pressure seal was from about 640-760 psi (4.4-5.2 MPa). The coagulum was then discharged through the pressure seal to atmospheric pressure to form a very fine, porous, steaming crumb containing about 10% water. The throughput was 246 dry kg/h and the drive power at 622 rpm was 36 kw. A thin layer of the crumb was continuously belt fed into a dryer vibrating at 720 rpm with a 3 mm stroke 26 degrees from the vertical and equipped with a 4.3 square meter perforated level drying deck through which 156° C. air was blown through the polymer at a rate of 7800 standard cubic meters per hour. The polychloroprene crumb was subsequently cooled. The drying time of the crumb on the deck was 123 seconds based on the average travel time of nine 30 mm squares of rubber gasket material. Based on three groups of three samples each taken over a one hour operating period, crumb from the extruder contained 3343 parts of chloroprene dimer per million parts dry rubber, while the crumb exiting the dryer contained 698 parts chloroprene dimer per million parts dry rubber, a 79% reduction in dimer level.

EXAMPLE 3

A polychloroprene latex was prepared as described in Example 1, except that 100 parts of 2-chloro-1,3-butadiene was substituted for the mixture of monomers. The polychloroprene latex having a specific gravity of 1.08 and a solids content of 41%, was introduced to the screw extruder described in Example 2. The polychloroprene latex was coagulated with a 4% acetic acid solution containing 0.67% "Emcol" CC-9, introduced as described in Example 2. The bulk of the water was removed through a vent port stuffer upstream from the pressure seal. The back pressure generated by the pressure seal forces water out the vent. The resultant wet polychloroprene was expressed past the flow restriction pressure seal with the barrel valve ⅛ turn open. The coagulum entering the pressure seal contained no more than about 18 percent by weight water. The coagulum was then discharged through the flow restriction at pressures of 630-830 psi (4.3-5.7 MPa) measured immediately upstream of the pressure seal to atmospheric pressure to form a very fine porous crumb containing 15% water. The throughput was 234 dry kg/h and the drive power at 500 rpm was 34 kw. The polychloroprene crumb was continuously belt fed into a dryer as described in Example 2, vibrating at 720 rpm with a 5 mm stroke 26 degrees from the vertical and with 7800 standard cubic meters per hour of 163° C. air blown through a thin layer of the polymer on the drying deck. The drying time of the crumb on the deck was 103 seconds. Crumb from the extruder contained 3918 parts of chloroprene dimer per million parts of dry rubber, while the crumb exiting from the dryer contained 726 parts chloroprene dimer per million parts dry rubber, an 81% reduction of chloroprene dimer. The crumb was cooled by passing 1800 standard cubic meters per hour of 28° C. air blown through a cooling deck.

We claim:
1. A process for removing chloroprene dimers from polychloroprene which comprises:
   (a) feeding to a screw extruder a polychloroprene latex,
   (b) coagulating the polychloroprene latex in the screw extruder,
   (c) feeding the coagulated polychloroprene in the extruder into a dewatering zone,
   (d) discharging the coagulated polychloroprene through a flow restriction which heats and pressur- izes the polychloroprene to an area of reduced pressure thereby forming a porous polychloroprene crumb while, at the same time, said flow restriction applies back pressure sufficient that water present in the coagulated polychloroprene is separated therefrom and forced out of a vent provided in the extruder upstream from the flow restriction, (e) heating the porous polychloroprene crumb discharged from the extruder by passing a stream of gas substantially inert to the polychloroprene through the polychloroprene crumb at a temperature of at least about 100° C. for a time sufficient to strip from the polychloroprene by diffusion at least about 50% by weight chloroprene dimers.

2. A process of claim 1 wherein the gas is air.

3. A process of claim 2 wherein the polychloroprene crumb is dried on a vibrating conveyor.

4. A process of claim 2 wherein the polychloroprene crumb is dried for from about 2 to 4 minutes at about 140°–160° C.

5. A process of claim 1 wherein the polychloroprene discharged from the extruder contains from about 2–35 weight percent water.

6. A process of claim 2 wherein the polychloroprene is discharged from the extruder at a temperature of from about 50°–100° C.

* * * * *